Patented Jan. 1, 1924.

1,479,347

UNITED STATES PATENT OFFICE.

EDUARD WEYMANN, OF DORTMUND, GERMANY, ASSIGNOR TO EISEN-UND STOHLWERK HOESCH AKTIENGESELLSCHAFT, OF DORTMUND, GERMANY.

METHOD FOR THE HEATING OF MELTING FURNACES OR THE LIKE.

No Drawing.    Application filed March 1, 1923.   Serial No. 622,211.

*To all whom it may concern:*

Be it known that I, EDUARD WEYMANN, a citizen of the German Republic, residing at Dortmund, Germany, Prinz Friedrich Karlstrasse 35, have invented certain new and useful Improvements in a Method for the Heating of Melting Furnaces or the like, of which the following is a specification.

The invention relates to improvements in a method for the heating of melting furnaces or the like.

In the heating of such furnaces it has already been proposed to increase the combustion temperature by employing pure oxygen or air enriched with pure oxygen. But, the production of oxygen being too expensive, this method has practically not been employed. For this reason, hitherto high temperatures are only obtained by utilizing the hot waste gases in recuperative chambers for preheating air or gas and air. The waste gases leave the recuperation chambers at a temperature of 900 to 1100 deg. F. Should this heat still be used for producing steam, the produced quantity of steam is relatively small.

This heating process thus gives a determined energy circulation which is uneconomic owing to the loss in the recuperative chambers, the disadvantageous heat exchange and the costs for maintaining the whole recuperative device.

The present invention now permits more usefully the heating of melting furnaces or the like by providing a new and advantageous energy-circulation. This energy-circulation is obtained by using oxygen gas in combination with combustible gases and utilizing the full caloric effect of the still highly heated waste gases directly behind the furnace for energy production, this energy being sufficient to produce the required oxygen. This considerably simplified energy circulation avoids the large loss and increases the heat efficiency. Recuperation chambers become dispensable with this method which gives the possibility to use pure oxygen for combustion purposes.

The advantages of the improved proceeding may be more clearly explained by the following arithmetical example.

A 100 tons Martin furnace consumes per hour 106000 cubic feet of coke oven gas having a calorific value of 92.5 B. t. u. per cubic foot.

Should the same furnace be worked without preheating air and gas, there are required per hour about 24700 cubic feet of pure oxygen to enrich the combustion air.

Evidently the gas consumption is higher in the latter case owing to the heat recuperated by preheating the air in the other case. The gas consumption increases from 106000 to 124000 cubic feet per hour.

By utilizing the waste heat of the Martin furnaces in the boilers usually arranged behind the preheating chambers and the change valve, from the 106000 cubic feet of gas will be got 4700 pounds of steam of 140 lbs. per sq. inch superheated to 570 degr. F.

When the combustion air is enriched with oxygen, and steam is produced directly behind the furnaces (no preheating chambers are provided), from 124000 cubic feet per hour are obtained: 19700 pounds of steam of 142 lbs. per square inch superheated to 570 degr. F.

From the 18000 cubic feet of gas added per hour there may be produced by directly heating boilers: 5000 pounds of steam.

Consequently, from 106000 cubic feet would remain 19700—5000=14700 pounds of steam.

When from this quantity is deducted the quantity of steam which can be produced in a boiler provided behind the recuperative chambers, there remains 14700—4700=10000 pounds of steam per hour.

A modern oxygen producing device consisting, for instance, of a plant for producing liquid air and separating the oxygen as, for instance, the Claudé process, requires 0.034 H. P. per cubic foot of oxygen. In a modern steam turbine plant 9.92 pounds of steam of 140 pounds per sq. inch, superheated to 470 deg. F. are consumed for 1 H. P./hour.

Consequently, for producing the 24700 cubic feet of pure oxygen to be added, a quantity of 24700×0.034×9.92=8300 pounds of steam required.

As, however, 10000 pounds of steam are disposable, there results an excess of 1700 pounds of steam per hour.

This arithmetical example proves, that the improved proceeding consisting in a modified energy circulation insures a very economic utilization of the heat. Moreover, it permits of a remarkably simplified structure of melting furnaces or the like by avoiding the recuperative chambers and the control-valves, and it results in a considerably reduced expense of entertaining the furnaces.

It will be understood, that the furnaces may be of any desired construction. Oxygen may be introduced into the burners or into the heads of the furnace or into the nozzles or may otherwise be added. All the well known supplying systems may be employed either separately or together or interchanging as circumstances may require it.

I claim:—

The hereindescribed cyclic method which consists in generating the heat in melting furnaces by oxygenated air and fuel, generating steam by heating steam boilers by the gases escaping from said furnaces, utilizing the steam in the operation of an oxygen producing apparatus, adding to air the oxygen so produced and finally mixing the oxygenated air with fuel for again heating the furnaces.

In testimony whereof I have affixed my signature in presence of two witnesses.

EDUARD WEYMANN.

Witnesses:
  HENRY W. NACEY,
  S. ROOCTEN.